United States Patent [19]
Wrasidlo

[11] Patent Number: 4,902,424
[45] Date of Patent: Feb. 20, 1990

[54] ULTRAFILTRATION THIN FILM MEMBRANES

[75] Inventor: Wolfgang J. Wrasidlo, LaJolla, Calif.

[73] Assignee: Memetc North America Corp., Timonium, Md.

[21] Appl. No.: 232,930

[22] Filed: Aug. 9, 1988

Related U.S. Application Data

[62] Division of Ser. No. 920,365, Oct. 26, 1986, Pat. No. 4,814,082.

[51] Int. Cl.$^4$ .............................................. B01D 13/00
[52] U.S. Cl. ........................... 210/500.36; 210/500.37; 210/500.38; 210/500.41
[58] Field of Search ....................... 210/500.41, 500.21, 210/500.34, 638, 654, 500.37, 500.36, 500.38

[56]  References Cited
U.S. PATENT DOCUMENTS

3,904,519  9/1975  McKinney, Jr. et al. .......... 210/654
4,659,474  4/1987  Perry et al. .......................... 210/638

*Primary Examiner*—Frank Spear
*Attorney, Agent, or Firm*—Waldron & Associates

[57] ABSTRACT

Mono-layer thin film membranes are provided which are ultraporous. Such mono-layers are formed having a thickness on the order of about 1.2 to 150 nanometers, by a variety of polymerization, cross-linking, and film treatment processes to achieve the development of controlled pore sizes in the ultraporous size range corresponding to a molecular weight cutoff values of from about 500 to about 1,000,000. Such thin film mono-layer membranes are ordinarily supported on a microporous support material, desirably a microporous polymer membrane having a smooth, microporous skin with pore sizes in the range of from about 0.1 microns to about 3 microns, preferably from about 0.1 microns to about 0.5 microns, in diameter. There may be an intermediate gel layer. These membranes are useful for ultrafiltration, dialysis, and molecular separations.

13 Claims, 1 Drawing Sheet

ULTRAFILTRATION THIN FILM MEMBRANES

This is a divisional of application ser. No. 920,365, filed Oct. 26, 1986, now issued as U.S. Pat. No. 4,814,082.

BACKGROUND OF THE INVENTION

This application relates to ultrafiltration thin film membranes.

More particularly, this application relates to ultrafiltration thin film membranes formed of cross linked polymers, and to methods and techniques for the manufacture thereof.

In addition, this application relates to composite ultrafiltration thin film membranes, having an ultraporous thin film membrane supported on a microporous support member, and to methods and techniques for the manufacture thereof.

Ultrafilters and ultraporous membranes are widely used for a wide diversity of filtration and separatory processes, as well as diffusion processes, such as dialysis and the like. It has long been known that the performance of such membranes is generally limited by the effective thickness of the membrane, since for a given type and pore size, the thicker the membrane (or the thicker the active layer of the membrane) the lower the permeability at the working pressure differentials in use. It has long been the objective of the art to enhance the performance of ultraporous membranes by reducing the thickness of the membranes or reducing the thickness of the active layer of the membranes.

The state of the art has been limited in its efforts to make thinner membranes and membrane active layers by the methodology by which such membranes are formed. Both integral and composite ultrafiltration membranes are known, and employed for a variety of uses. While numerous attempts have been made to make still thinner ultrafiltration membranes and thinner ultraporous active layers, the result has generally been on the one hand a loss of quality or filtration efficiency that precludes the effective usage of such membranes, or on the other hand the use of membranes which are exceedingly expensive and difficult to make.

Concomitantly, there has been considerable effort in the reverse osmosis, or hyperfiltration, membrane art on the development of thin film membranes for reverse osmosis and other high pressure procedures. In the development of these efforts, a number of thin films have been attained. Some are cross linked polymers, so that there is a substantial body of knowledge available to those of ordinary skill in the art.

It has been thought that it would be desirable to obtain ultrafiltration thin film membranes. See for example, Wrasidlo, U.S. Pat. No. 4,005,012. There is, however, no effective technique for the production of ultrafiltration thin film membranes available to use in the art, and no effective enabling disclosure of how such membranes may be made which has effectively placed such ultrafiltration thin film membranes in the hands of those of ordinary skill in the art or into the possession of the public.

The earliest reference to thin film reverse osmosis membranes appears to be the teachings of Cadotte, U.S. Pat. No. 3,926,798, based on the in situ polymerization of furfural alcohol on a porous support. A highly cross linked thin film membrane suitable for reverse osmosis results Cadotte does not teach or contemplate controlling or limiting the cross link density, so that there is no possibility that an ultrafiltration condition can result.

Interfacial condensation polymerization has since been employed to obtain thin films with a variety of polymer systems. See for example, Morgan, *Condensation polymers: By Interfacial and Solution Methods,* Interscience, New York, 1965.

Among the polymer systems explored are the following: Polyethylene imine solutions cross linked with toluene diisocyanate (TDI), isophthaloyl chloride (IPC), or trimesoyl chloride (TMC); m-Phenylene diamine solutions cross linked with TDI, IPC, or TMC; cross linked aromatic polyamides, and such as the cross linked polyether condensation polymer of 1,3,5,-trishydroxyethyl isocyanate and furfuryl alcohol. None of these have been reported in ultrafiltration thin films, and the art has not recognized either the possibility of doing so or any methodology by which such an objective might be attained.

What the art has recognized is that all these polymers are subject to severe chemical attack under the usual conditions of use in reverse osmosis, and as a consequence of these factors, such thin film polymers have met with limited use.

It is seen that the thin film membranes of the prior art are semi-permeable reverse osmosis membranes, and that thin film membranes, i.e., down to mono-molecular thickness, are not known in ultrafiltration or other related uses which require that an extremely thin film be ultraporous in character.

OBJECTS OF THE INVENTION:

It is an object of the present invention to provide ultrafiltration thin film membranes.

Another object of the present invention is ultrafiltration thin film membranes made from a diversity of polymers.

Still another object is to provide ultrafiltration thin film membranes which are durable and effective for ultrafiltration and diffusion.

It is also an object of the present invention to provide composite ultrafiltration thin film membranes, in which the active layer is the ultraporous thin film membranes of the present invention.

It is another object of the present invention to provide techniques for the production of ultrafiltration thin film membranes.

It is yet another object of the present invention to provide techniques for the effective, reproducible production of high quality, uniform and effective thin film membranes with controlled pore sizes in the ultraporous size range.

SUMMARY OF THE INVENTION:

Ultrafiltration thin film membranes are provided in the present invention by controlled cross linking of polymer films of substantially monomolecular thickness by techniques which afford control over the cross link density in the thin film, achieved by regulating the cross link determinants of the polymer system. The resulting thin films, with the requisite cross link density are ultraporous, and range in thickness from monomolecular, i.e., on the order of 1.2 or 1.5 nanometers, up to about 200 nanometers, more often up to about 150 nanometers, and preferably less than about 50 nanometers. The pore sizes in the ultraporous thin film membranes are in the range to produce molecular weight cutoff values of from about 500 to about 1,000,000. The properties of the thin film are determined by the specific properties of the selected polymer system employed, but with careful selection and good processing technique, it is possible to attain ultrafiltration thin film membranes with physical and chemical properties appropriate to use in a wide variety of ultrafiltration and diffusion operations.

The ultrafiltration thin film membranes will most often be elements of composite membranes, i.e., supported on a physical support which is itself porous, ordinarily microporous, which provides physical support and reinforcement for the ultraporous thin film, and which poses minimal resistance to the flow of fluids and permeate passing through the ultrafiltration thin film membranes.

The ultrafiltration thin film membranes are made, in the present invention, by the formation of a thin polymer film under condition where the polymer system is crosslinked to result in a controlled cross link density.

There are three preferred techniques provided in the present invention for the attainment of the controlled cross link density required:

Polymer solutions, or solutions of oligomers or prepolymers, can be formed into films on the surface of a supporting medium. Either by the thinness of the solution, or by orientation of the polymer at the surface of the solution, or both, the polymer forms a thin monomolecular layer at the surface. The polymer is then reacted at the interface of the solution with a cross linking reactant in a diverse, generally immiscible phase. By control of the extent of the reaction, thickness of the resulting thin film and its cross link density are controlled, which in turn determines the pore size of the resulting ultraporous thin film membranes, to provide molecular weight cutoff values of from about 500 to about 1,000,000.

In an alternate approach, monomers, or mixtures of monomers, are disposed in a solution on a supporting medium, and are thereafter contacted with a diverse immiscible phase containing the balance of a reactive system which then results in the formation of a highly branched or cross linked polymer at the surface of the solution. By close control over the degree of branching, crosslinking, chain transfer and chain termination, the result is an ultraporous thin film membrane.

Another procedure entails the formation of a cross linked thin film, which may be dense or "hyperporous," i.e., a reverse osmosis membrane, which is then reacted to controllably disrupt cross linkages to convert the thin film to an ultraporous thin film membrane. By control over the nature of the reaction and its extent, close control of pore size and other good properties can result.

These procedures can be employed alone or in combination, among themselves and with still other techniques. As an example of such other techniques, there is developing interest in plasma polymerization and plasma cross linking procedures.

DETAILED DESCRIPTION OF THE INVENTION:

In the present invention, the following terms are assigned the following specific meanings, unless a contrary meaning is made clear in the context of usage:

Active layer: In the context of the present invention, that layer of a composite membrane the pores sizes of which control the molecular weight cutoff values of the membrane. In composite membranes in the present invention, the active layer is the component which is the major contributor of flow resistance.

Molecular Weight Cutoff: An expression of the retention characteristics of a membrane in terms of molecules of known sizes. Retention is rated as that molecular weight cutoff at which at least 90 percent of spherical uncharged molecules of that same molecular weight will be retained by the porous membrane, whereas less than about 50 percent of such molecules of significantly lower molecular weight will be retained However, linear molecules with molecular weights greater than the molecular weight cutoff may pass through the membrane, whereas charged molecules less than the molecular weight cutoff may not pass through. In ultrafiltration membranes, the molecular weight cutoff ranges from about 500 or 1000 up to about 1,000,000. In the case of ultrafiltration thin film membranes generally, there is considerable difficulty in directly observing and measuring pores and pore sizes, as by scanning electron microscopy, for example. It has become common in the art to employ molecular weight cutoff values as an inferential and indirect technique for the determination of pore sizes. As a general proposition, the functional diameter of pores is approximately equal to the cube root of the molecular weight of the largest generally spherical, globular molecule, free of electronic charge which can pass through the membrane, while the size of the smallest such molecule which is retained to the required extent of 90 percent represents the molecular weight cutoff. These determinations are well known to those of ordinary skill in the art.

Ultrafiltration membranes are generally those membranes having limiting pore sizes effecting molecular weight cutoff values of from about 500 to about 1,000,000 , and fit into the spectrum of porous membrane media between the type generally considered to be reverse osmosis membranes and microporous membranes Ultrafiltration membranes would, for example, permit in excess of 50 percent of the NaCl content of salt water to pass through the membrane, and thus would not be of interest for desalinization of water.

Ultraporous membranes are widely used for a variety of procedures, including concentration driven, low pressure processes, such as diffusion and dialysis, particularly hemodialysis applications in artificial kidney machines and the like, in pressure driven processes, i.e., ultrafiltration, and in a diversity of other applications, such as electrodialysis, ion exchange processes, and as electrode separators in electrochemical storage batteries, and the like. The wide utilization of such membranes has led to considerable effort to improve the effectiveness of such membranes.

Reduced resistance to flow through the membrane is one of the most important feature of thin film membranes of the present invention in comparison to the state of the art ultrafiltration membranes. The ability to closely control the pore sizes is of considerable import as well.

It has come as a considerable surprise that the ultrafiltration thin film membranes of the present invention are exceptionally effective for molecular separations. While such procedures are sometimes performed with conventional ultrafiltration membranes, there is a rapid fouling and blockage of the membranes. These characteristics have proved rather intractable, and have limited the use in practice of ultrafiltration as a technique for molecular separations. The ultrafiltration thin film membranes of the present invention exhibit very little internal fouling, and very little susceptibility to plugging. The cause of these highly advantageous features is not completely explored, but it is believed that because of the thinness of the membrane, and the consequent shallowness of the limiting pores in the thin film, the pores are not susceptible to entrapment of materials having a diameter at or very near the size of the pores, and this characteristic permits such molecules to be flushed away from the pores under the conditions of use. Whatever the precise reason for such effects, it is most important that the art is now provided with ultrafilters and ultrafiltration membranes which effectively perform molecular separations at effective working efficiencies and for effective operating duty cycles.

Figure 1:
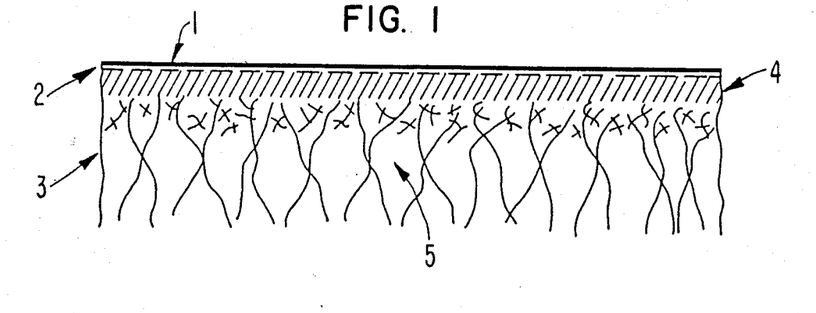
FIG. 1 shows in schematic form a preferred composite structure of the ultrafiltration thin film membranes of the present invention in illustrative form.

An illustrative and schematic representation of the preferred composite form of the ultrafiltration thin film membranes of the present invention is shown in FIG. 1, wherein the thin film 1 is shown supported on gel layer 2, which in turn is supported on microporous membrane 3, having skin 4 and underlying open porous structure 5.

The polymer systems of the present invention are all those cross linked polymer species employed in the formation of membranes. As those of ordinary skill in the art will recognize, the selection of polymer and cross linking systems will most often depend on the intended environment of use and the service duty required of the ultrafiltration thin film membranes. A wide diversity of such materials and systems is known. See for example, Kesting, Robert E., *Synthetic Polymeric Membranes: A Structural Persoective*, 2d. Ed., Wiley-Interscience, New York, 1985. Only cross linked systems are a part of the present invention, but as that term is employed herein, it is intended to include those polymers formed from monomers which cause, at least in part, a high degree of branching to provide integral cross linking as a part of the polymer structure, particularly those formed in interfacial condensation polymerizations, as well as reactions of polymers with cross linking reagents which tie different polymer molecular chains together. Such polymers include, generally any crosslinkable member selected from the group consisting of polysaccharides, polysilicones, polyamides, polyacrylics, and polyimines.

It will most often be preferred or necessary to employ polymers which are available in forms which are soluble in solvents, to facilitate the formation of thin films of the solution and thereafter to cross link the polymers with a cross linking reactant at the interface with a separate phase in an interfacial reaction. Typical of this class of polymer systems is the preferred system in the present invention, the use of aqueous solutions of polyethylene imine, in a solution spread in a thin layer on the surface of a supporting medium, and thereafter contacted with a dilute solution of toluene diisocyanate in hexane to form polyurea cross links This preferred polymer system is the basis of much of the discussion herein, and is sometimes referred to as the PEI/TDI polymer system.

Also of considerable interest is the polyamide resulting from cross linking of the PEI with isophthaloyl dichloride, sometimes referred to as the PEI/IPC polymer system.

Other polymer systems of interest are the aromatic polyamides formed by interfacial condensation polymerization from epiamine, m-phenylene diamine and other diamines and the like, condensed with IPC and/or TMC, and a variety of other related species. This system is typical of the formation of ultrafiltration thin film membranes from monomeric systems.

It is believed that the potential reactive sites along the polymer chains are highly active in thin films because of a much reduced hindrance of these sites in comparison to thicker structures of these same polymers This is equally true in the present invention as it is in the reverse osmosis thin film membranes of the prior art. As a consequence, it is important to select the appropriate polymer system for a particular environment of use to avoid the effects of chemical degradation. Those of ordinary skill in the art will have little difficulty in selecting appropriate polymer systems and species by these criteria It is a direct consequence of the techniques employed that the resulting membranes are thin films, as that term is employed herein. A thin film in the context of the present invention is generally a monomolecular layer, based on the thickness of the monomer molecules and/or the oligomer or prepolymer molecules employed, and their orientation at the surface of the solution where the cross linking reaction occurs. As those of ordinary skill in the art will recognize, the interfacial reaction techniques employed in the present invention in the formation of the thin films will result in the polymerization and/or cross linking reaction occurring at or immediately adjacent the interface, so that reactive sites and components remote from the reactive zone at the interface do not react. By this feature in the formation of such thin films, the thickness will ordinarily range from about 1.2 nanometers up to as much as 150 nanometers, but will ordinarily be less than about 50 nanometers. Such monolayers may have pendant chains with unreacted sites, and in some contexts advantage may be taken of these features, as discussed infra. The thin film itself, however, will ordinarily be limited to the cross-linked portions of essentially monomeric dimensions at the interface, or those portions of longer chains which are oriented at the interface. As noted supra, thin films in the sense of the present invention have achieved a recognized status in the reverse osmosis art, so that those of ordinary skill in the art clearly understand the meaning assigned herein to the term thin film. As has already been recognized in the art, such films are difficult to observe or measure by direct techniques, and resort must often be had to inferential techniques, or destructive techniques, to examine the properties of the film.

The ultraporous thin film membranes of the present invention will most often be employed disposed on a porous support, normally a microporous support. Within limits, the support may be selected from those heretofore used as supports for reverse osmosis thin film membranes, and can be made of a wide diversity of materials. Preferred are those integral, skinned synthetic polymer microporous membranes, in a diversity of polymer materials, including polysulfones, polyether sulfones, polyvinyl chlorides, chlorinated polyvinyl chlorides, diverse polyamides, polyesters, polycarbonates, polyurethanes and polyureas, polysilicones, cellulose derivatives, and the like.

Particularly preferred are the polysulfone membranes commercially available from Brunswick Technetics as BTS polysulfone, and those disclosed in European Pat. Office Application 81/301074, and in U.S. application Ser. No. 130,560, filed Mar. 4, 1980 and Ser. No. 291,927, filed Aug. 11, 1981, now U.S. Letters Pat. 4,629,563, the disclosures of which are incorporated herein by reference.

The microporous membranes of the preferred structure are characterizable as reticular, highly asymmetric, having exceptionally good permeability and unusually low resistance to flow for a given pore size or molecular weight cutoff. In addition, these preferred supports have unusually smooth and regular skin surfaces, and high pore densities and are thus near ideal support structures for the ultraporous thin film of the present invention.

As in the case of the selection of polymer systems for the ultraporous thin film membranes, it will also be appropriate to select the support membrane polymer for its suitability for the intended environment of use. Those of ordinary skill in the art will be able to make the selection from among the suitable materials as is customary in the membrane art. The polysulfones and polyether sulfones are generally preferred for most applications, for the reasons already well known to those of ordinary skill in the art, including their ready availability, their desirable physical and chemical properties, and particularly in food service and pharmaceutical usages, their status of being generally recognized as safe for such applications.

It is also appropriate to select support structures with a view to the physical demands of the intended use and the needs and requirements of the ultraporous thin film to be supported. It is important, for example, that the support afford a smooth supporting surface, free of large expanses which require the ultraporous thin film to bridge large pores or other artifacts on the support surface. This requirement will ordinarily dictate that the support be skinned, and preferably that it have a very smooth skin. The pores of the support skin should be, preferably, on the order of about 0.05 to 0.5, more preferably from about 0.1 to 0.2 microns in diameter. Larger pores impose great physical burdens on the ultraporous thin film by the requirement that the large spans across the pores must be self supporting, and the span should be no larger than necessary. Smaller pores, below about 0.05 micron, are generally undesirable since they then would tend to contribute to limiting porosity of the composite, and retard flow rates through the composite to a degree to be avoided if possible. In addition, such supports would themselves function as ultrafilters, and be susceptible to all their shortcomings, including the incidence of fouling and plugging of the pores.

It is also possible to improve on the characteristics of the ultrafiltration thin film membranes, and particularly their physical integrity, by interposing between the ultraporous thin film and the support a thin, highly porous gel layer. The gel layer, when employed, will provide an intermediate aid to bridging the pores of the support, improve flow properties in some cases, and in appropriate circumstances, permit the formation of composites of otherwise incompatible supports and membrane polymer systems. All these features, and others, are discussed in detail hereinafter.

Given the dimensions of the thin films in the present invention, while they are a material advance in physical integrity and strength in comparison with the prior art thin films, they are, nonetheless, relatively fragile structures in an absolute sense For many polymer systems, the integrity of the thin film can be greatly enhanced by the provision of a gel layer to aid in bridging the pores of the support Particularly for monomolecular thin films, it is noteworthy that a 1.5 nanometers thickness film may be required to bridge a pore diameter of 100 nanometers or more. It is readily apparent that when the thickness of the film is on the order of only 1.5% of the span, the physical demands are considerable. In addition, the gel can effect an intermediate surface with a degree of smoothness not always afforded by the support Excessive surface roughness of the support can be a serious problem.

In that context, it is apparent that the provision of an intermediate gel layer, which forms an intermediate supporting structure, can be of considerable assistance in improving the physical support for the thin film layer.

In another context, some microporous support layers have limited pore densities on the surface, and when the thin film is in direct adherent contact with the surface, only those areas of the thin film which directly overlie the pore area are able to function; the other areas of the thin film will be blocked by the dense surface of the support. In that eventuality, an intermediate gel layer will provide a flow path from such "blocked" areas of the thin film to an adjacent pore of the support.

It is also possible in some cases to employ a gel layer as a protective coating on the surface, or even within the interior pores, of a support material to permit the application of a thin film which entails the use of a polymer formation otherwise incompatible with the support polymer. Such would often be the case when it is desirable to use a solvent, for example, which dissolves the support polymer, or reactants in the thin film polymer system which react with the support polymer in an undesirable or unacceptable way.

It will be readily apparent that the selection of the polymer for the formation of the intermediate gel layer will be dictated largely by the function it is intended to perform. The material must form a stable gel layer in a suitable solvent for its application to the support. It must retain or, if dried, regain its gel character in the intended environment of use. The gel must ave suitable physical and chemical properties to provide the intended benefits. Most importantly, the gel must be sufficiently permeable to the solvents and other permeate in the intended use to represent a minimal resistance to flow. In addition, the gel must be stable, i.e., not soluble in the various solvents and related media with which it is contacted, so that none of the gel forming material passes into the filtrate in use.

In order to meet all these diverse criteria, it will ordinarily be preferred to employ a cross linked polymer gel. It is by cross linking that the important criteria are most readily attained with the greatest diversity of gel forming polymers. As those of ordinary skill in the art will readily understand, such cross linking should be limited to the minimum degree necessary to the attainment of the functional requirements of the composite ultrafiltration thin film membranes, as excessive cross linking may impair or limit porosity and flow rates of the resulting composite membrane. It is preferred that the gel be irreversibly bound to the thin film and to the support whenever possible.

While as a general proposition, the gel layer may be formed of substantially any cross linkable gel forming polymer, it will often be appropriate to form the gel layer from the same polymer system as that employed in the formation of the ultraporous thin film. When the polymer system employed is suitable for both aspects of the composite, there are several advantages which accrue. First, compatibility of these components is assured, and in many circumstances, the gel intermediate layer will be readily covalently cross linked to the ultraporous thin film membrane layer, enhancing the integrity of the thin film and of the composite of which it is a part. Such a procedure eliminates or limits the requirement for washing away underlying increments of the thin film forming constituents of the polymer system after the thin film is cross linked, which otherwise may be required, so that production economies are realized. Additionally, with the provision of a cross linking system which will bind the gel layer to the support, an entirely covalently bound composite structure can result. On the other hand, compatibility and gelation, or the maintenance of a gelled condition, is required in the media with which the composite is to be used, and this may preclude such a possibility for some polymer systems. When the composite is to be employed to process aqueous media, for example, the gel must be a hydrogel, or at least sustain its solvated character in the aqueous medium. Thus, while the gel layer may, in this example, be formed in a nonaqueous, highly polar solvent, it must hydrate on exposure to water or the gel will lose, or never have, the necessary characteristics for adequate permeability.

When such intermediate gel layers are employed, it is desirable that the thickness of the layer, in hydrated form be sufficient to afford the physical parameters required, and no more. While this will be very much greater than the dimensions of the thin film, it will ordinarily be on the order of about 0.1 to 5, and preferably about 0.5 to 2, microns in the gel state, less i the event the gel is dried. Thinner gel layers introduce the risk of the gel layer being discontinuous, while thicker layers unacceptably increase the resistance to flow.

In some contexts it will be possible to employ the gel layer as the sole support for the ultraporous thin film membranes of the invention, but such techniques are not generally preferred The physical demands of the environment of use must be rather undemanding in most circumstances for such an approach to be effective.

The specific demands of the environment of use will ordinarily dictate the particular requirements of the gel layer. The polymer employed must be gel forming in the media with which it will be used. The gel must have a porosity greater than that of the ultraporous thin film with which it is employed. It must resist degradation and attack in the context of use. It must have adequate resistance to pressure to avoid excessive compression, compaction or extrusion into the support pores in use at the pressure differentials needed for the service. It must not have components soluble in the context of use which could contaminate the media being processed, and must not interact in any impermissible way with the process stream in use.

With these criteria in mind, those of ordinary skill in the art will recognize that a wide diversity of polymer materials can be employed, including of course all those mentioned above for the selection of the thin film forming polymers. In addition, a wide diversity of cross linkable gel formers are known. Exemplary of those are the gel layers in the applicant's disclosure in U.S. Pat. application, Ser. No. 526,811, originally filed Jan. 15, 1981 as U.S. Ser. No. 225,348, the disclosure of which gels, and the formation and behavior of which, is hereby incorporated by reference herein.

Taken in combination, the usual membranes in the present invention are made up of a composite of the foregoing components, i.e. the ultraporous thin film, the intermediate gel layer, and the microporous support. As has already been noted herein, the present invention also is directed to the ultraporous thin film membranes as such, and to various combinations and subcombinations of these various elements.

As already noted, the preferred technique for the formation of the ultraporous thin film of the present invention resides in the now well known technique of interfacial polymerization. Interfacial condensation polymerization has been employed to obtain thin films with a variety of polymer systems. See for example, Morgan, Interscience, New York, 1965. Those of ordinary skill in *Condensation polymers: By Interfacial and Solution Methods,* Interscience, New York, 1965. Those of ordinary skill in the art will gain substantial guidance in the techniques for the practice of the present invention there. See also Kesting, Robert E., *Synthetic Polymeric Membranes: A Structural Perspective,* 2d. Ed., Wiley-Interscience, New York, 1985, for further discussions concerning the relevant considerations, particularly in the context of porous membranes.

It is central to the present invention, however, that the techniques of interfacial condensation are not, as is usual, permitted to proceed to a fully cross linked state in order to provide a thin film membrane, or in the alternative, that the effect of full cross linking is partly reversed. By one or more of the techniques discussed herein, the procedure is modified to produce ultraporous thin film membranes by virtue of control of the cross link density in the resulting thin film, through regulating the determinants of cross link formation, or by selective disruption of formed cross linkages.

The term "cross link density" is, in the context of the present invention, the level of polymer cross linking appropriate to produce pores in the ultraporous thin film of the desired size corresponding to molecular weight cutoff values of from about 500 to about 1,000,000. For any given polymer system, the appropriate cross link density can be quantified, based on known parameters, known to those of ordinary skill in the art. For the cross linking of polymers, the major parameters which are the determinants of cross link density will often be, for example, polymer or oligomer concentration, the thickness of the film of the polymer solution on the support, the molecular weight or degree of polymerization, the nature, reactivity, and frequency within the polymer chain of cross linking reactive sites, the particular nature and concentration of the cross linking agent, and the like. In interfacial condensation polymerization, the degree of branching, and thus of the formation of cross linking branches is often determined by the functionality and proportions of cross linking monomers, and of chain transfer and chain termination agents. As a general proposition, then, the greater the degree of cross linking produced in the polymer system, and the more uniform the distribution of the cross links, the smaller the pore sizes. It is a relatively simple exercise for those of ordinary skill in the art to ascertain the appropriate degree of cross linking for a desired pore size given the guidance of the present invention and to regulate the determinants of the cross link density of the polymer system accordingly.

As those of ordinary skill in the art will recognize, the specific details of the molecular structure of the cross linked thin film are difficult to describe without resort to statistical methods, because of the highly diverse nature of the possible reaction site and reactions. The concept of a monolayer thin film, for example, should not be construed to prohibit the possibility of a portion of a polymer chain extending away from the interface where the cross linking reaction takes place, where it can remain as a dangling, unreacted portion of the polymer molecule. To the extent such artifacts are present, they are not readily amenable to observation, but it is believed that they are likely to exist to at least some degree Indeed, when the cross linked thin film is bound to its support, or to an intermediate gel layer, it is probable that it is such "dangling chain" structures which react In many circumstances, the presence of the thin film is not directly observable. Those of ordinary skill in the art will have little difficulty in ascertaining the presence and nature of such a thin film by indirect and inferential techniques, however.

It is a part of the present inventing to provide techniques for the control of cross link density in the thin films to assure that the required limiting pore sizes in the ultraporous range are attained. There are four techniques that have been employed alone and in combination. These are, for convenience, designated as reactant concentration control, time and temperature control, solution property control, and cross link disruption. As those of ordinary skill in the art will recognize, the effectiveness of each of these techniques will be dependent on the properties and nature of the particular polymer system employed. The adaptation of a particular system to the requirements of these procedures will, given the guidance of the instant application, be well within the level of ordinary skill in the art.

It will be readily appreciated that both polymerization reactions and cross linking reactions are subject to the usual effects of stoichiometric balance in their behavior, and that the properties of reaction products can readily be affected by the adjustment of reactant concentrations. In the context of interfacial condensations and interfacial cross linking reactions, the fundamental properties and characteristics of the thin films can often be determined by such parameters. When it is recognized that the interfacial boundary between phases can directly determine and limit the extent to which reactants can achieve reactive access to the reaction zone of the system, it is readily apparent that careful selection of reactant concentrations in the diverse phases, coupled with the balancing of the properties of the solvents and media employed, it is possible to exercise considerable control over the reaction, and thus over the properties and characteristics of the product. When the reaction system, by whatever means, an effect on the product is inevitable. In the simplest case, and the most common, if the constituent in short supply is a cross linking agent, then the available cross linking sites cannot be fully reacted, and the cross link density is directly controlled as a result The parameters which determine the concentration at the reaction zone in such a case would be the concentration of the cross linking agent in its phase, the gross amount of the cross linking agent available, the degree of miscibility of the two phases, the steric orientation of reactive sites of the polymer to be cross linked and of the cross linking agent at the interfacial boundary, the solubility of the cross linking agent in the polymer solvent, and, of course, the reactivity of the system. Because these parameters are not involved in a bulk reaction system, the properties must be varied from the stoichiometric balance by a material amount, often on the order of one or more orders of magnitude to achieve the desired result. Generally, the pore sizes of the present invention are attained when the deficient component is provided at about one order of magnitude less than that required for full and complete cross linking or less.

In other cases, the effective concentration of catalyst components may be an effective control of the extent of the reaction and of the cross link density, either alone or in combination with other parameters.

In the case of polymerizations directly from monomers to attain intrinsic cross linking in the polymer structure per se, the degree of cross linking, or branching, is usually governed, as is commonly known and practiced in the polymer art, by balancing the relative proportions of multifunctional monomers and branch initiating monomers, chain transfer and chain stopping agents, and other related parameters of the polymerization system. In adapting such polymerization systems to the context of the present invention, the number of such parameters which require control can be considerable and the system may grow rather complex, as those of ordinary skill in the art will readily appreciate, but the same considerations as discussed above will control the result, and the same advantages and benefits will be attained.

It is also possible in many systems to contribute additional control over the course of the reactions involved by controlling time and temperature of the reaction In some systems, the kinetic parameters may be such that time and temperature alone can be the sole or primary control mechanism, and in such cases, the effective control of cross link density is particularly simple and effective.

One parameter which is of considerable import is the character of the polymer or monomer solution. It is obviously not appropriate to limit concentration in such a way that a continuous thin film does not form, so that it is essential that there be a continuous layer of the primary reactant in such cases. On the other hand, there are several parameters which affect the characteristics of the reaction and of the reaction zone, and which can be employed to advantage in a number of systems. For example, if the polymer to be cross linked orients itself in such a fashion at the interface that steric effects become a factor, substantial consequences can result. For example, some reactive sites might be highly polar, and orient themselves preferentially to the more polar of the two phases of the system. If this is the non-solvent phase for the polymer, containing the cross linking agent, the concentration of the reactive sites at the reaction zone will be quite high, while if the orientation is away from the reaction zone at the interface, reactivity will be impaired, and in extreme cases, the cross linking reaction may not proceed adequately. These factors can be adjusted and controlled when necessary by the proper selection of solvents, by the addition of co-solvents or surfactants in minor amounts to alter the properties of the interface and reaction zone, to lower the partition coefficient values or the interfacial energy barrier, for example.

In addition, it has been found that the thickness of the solution of the monomer or polymer on its support can have a surprising effect on the reaction It has been found that when a polymer solution is applied to a support and allowed to drain, in the systems observed, a stable thin solution layer is formed. No further drainage occurs beyond this point, and any further changes in the film thickness occurs by evaporation or the like. Such a film can then be cross linked with the very great advantage that the extent of cross linking is determined by time and temperature controls alone. While this effect is surprising and unexpected, and not fully understood, it is believed that the thinness of the stable films limits the mobility of the reactive sites within the solution in some fashion, by concentrating the solute polymer at the interface and increasing the viscosity, so that the population of reactive sites on the polymer or monomer at the interface boundary reaction zone is per se time and temperature dependent. Applicant does not intend, however, to be bound by any such hypotheses It is sufficient that the effect has been discovered and may advantageously be employed by those of ordinary skill in the art It is important to note that the solution must have a concentration of the monomer or polymer employed sufficient that a continuous thin film forms at the interface.

When such a thin solution film is formed on a support, it is ordinarily recognizable by the formation of a distinctive optical interference pattern, resulting in a golden or straw colored appearance, indicative of a thickness of about 100 nanometers. It has been observed that there is ordinarily an optimum drainage time for each polymer system, in that the permeability of the resulting thin film peaks, from an initially low value, at or shortly after the stable liquid film is achieved, and that the permeability of the thin film membrane formed on the surface of the liquid film declines over time after the optimum, presumably as a result of evaporation of the solvent, solubility of the solute in the solvent of the immiscible phase, and the resulting alteration of the interface properties. In addition, as the concentration of the polymer solute increases at the interface, the partition coefficient decreases, so the cross linking reactant may penetrate deeper into the film, giving greater and greater bulk polymerization effects, and progressively thicker films.

It has been observed in the past that thin films are highly susceptible to attack by oxidizing agent, hydrolyzing agents, and the like. Indeed, these shortcomings have been assigned in the literature as the reason for limited use of thin film membranes, as a class.

Applicant has now found that these limitations can be turned to virtues, by utilizing susceptibility to oxidation, hydrolysis, and the like as the means to selectively and controllably disrupt cross links in thin films to achieve appropriate cross link densities, producing ultraporous thin films. It has been observed that the limiting pore sizes of such thin film membranes are a direct function of the extent of such reactions.

Virtually all crosslinking reactions are based on reactions which produce sites subject to attack by oxidation, hydrolysis, and like techniques. Again, applicant has no intent to be bound by hypotheses, but it is thought that such sites are hindered from attack in bulk systems, so that degradation by such attack is very slow, and that which does occur is largely masked by the bulk properties of the polymer mass. In the present context, bulk systems are a relative term, and would include films having a thickness greater than the thin films. In the thin films, the cross link structure, and the attackable sites, are quite exposed to such agents, so that the attack can proceed at relatively rapid rates.

It is thus possible to form thin film membranes, as dense films, as reverse osmosis membranes, or as ultraporous thin film membranes with pore sizes to be enlarged, and to thereafter treat the thin film with an attacking reagent suited to the particular polymer system to the extent necessary to attain the desired limiting pore size. This technique is useful for the modification of thin films however they are made and independently of the other techniques of the present invention, or may be employed in addition thereto.

Generally speaking, the reactants by which existing cross links are attacked will be oxidizing agents or hydrolyzing agents of moderately strong character in relatively dilute solutions. Very strong agents will be undesirable since they will exhibit a very low degree of selectivity, attacking all kinds of potential reactive sites at random, while less active agents will generally attack preferentially, disrupting bonds at the most highly reactive sites first, then the next most reactive sites, and so on. In dilute solution, these tendencies give quite acceptable control over the reaction and the results. It has been observed that the reactions involved are limited by the attainment of a near equilibrium steady state condition, where the reaction rate slows dramatically, and that the extent of the cross link disruption is primarily, if not entirely, a function of the concentration of the reactant. It is thus possible in many circumstances to alter the molecular weight cutoff to a particular desired value directly by controlling the concentration of the reactant, and continuing the treatment until the desired near equibrilimum values are attained.

Among the oxidizing agents, the most preferred is an aqueous solution of hypochlorous acid or sodium hypochlorite, at a concentration of from about one to five weight percent, often about two to three weight percent. With such a system, quite close control and optimization of limiting pore sizes can be achieved by monitoring time and temperature parameters.

Figure 2:
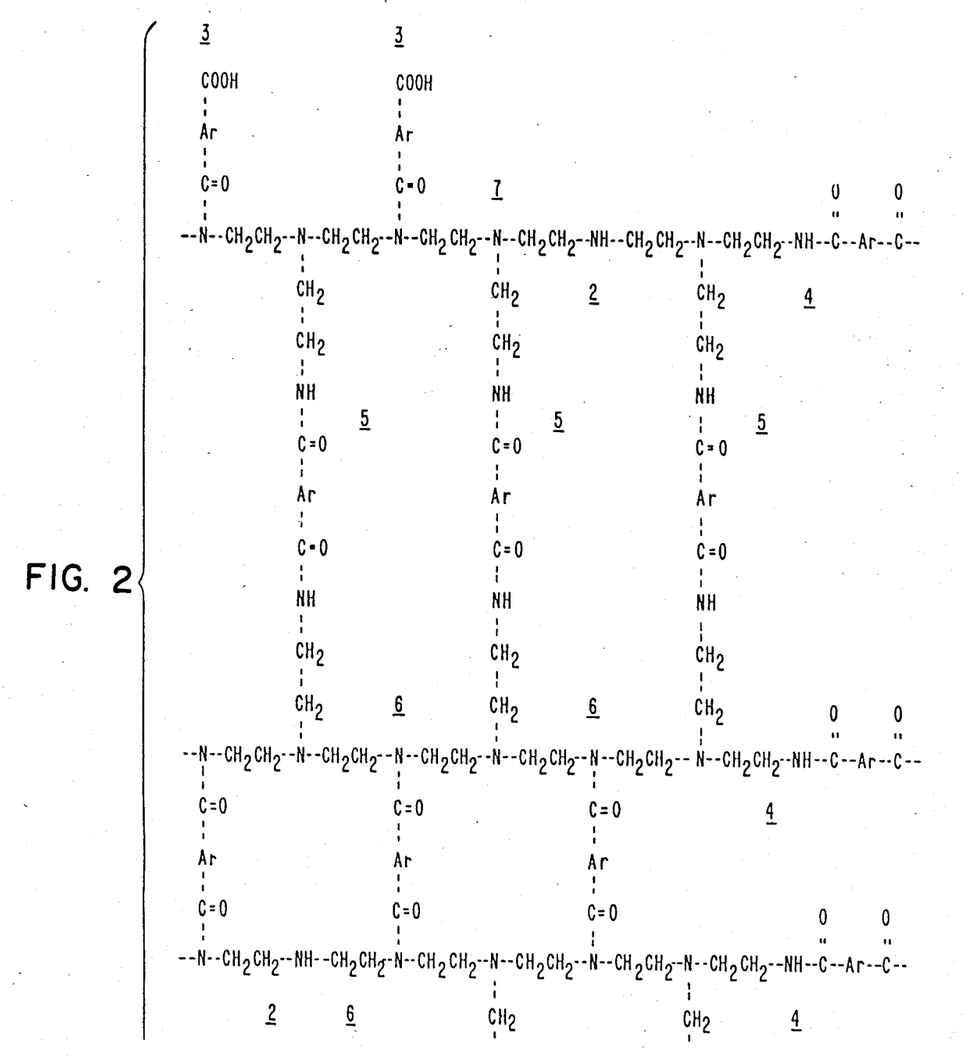
FIG. 2 illustrates the structure of a cross linked ultrafiltration thin film polyamide, in illustrative form, identifying the variety of reactive sites present in the polymer. The polyamide is representative of polyethylene imine crosslinked with isophthaloyl dichloride.

As an example of the effect of such a system, it will be helpful to those of ordinary skill in the art to consider the case of polyethylene imine cross linked with isophthaloyl dichloride. In this case, the resulting cross linked thin film polyamide will contain a wide diversity of reactive sites having different reactivities, in decreasing order of activity as follows:

1. Primary amine end groups — $-CH_2CH_2-NH_2$

2. Secondary amino groups — $-NH-$

3. Acid end groups — $-Ar-COOH$

4. Main chain primary amido groups — $-\overset{\overset{O}{\|}}{C}-NH-$

5. Side chain primary amido groups; — $-\overset{\overset{O}{\|}}{C}-NH-$

6. Secondary amido groups — $-\overset{\overset{O}{\|}}{C}-\underset{\underset{R}{|}}{N}-$ 7. Tertiary amino groups           —N—R The structure is shown, with these foregoing reactive sites identified, in an exemplary form, in FIG. 2, wherein the reactive groups above are represented by the corresponding reference numerals in the Figure.

In the context of the present invention, then, it is contemplated that these various reactive sites will be selectively and progressively attacked and destroyed until the desired porosity is achieved. The graduated reactivity permits active and precise control over the extent of the reaction, and the nature of the PEI/IPC cross linked polymer system greatly facilitates this procedure. As those of ordinary skill will readily recognize, the multiple reaction sites will be distributed over the face of the thin film in an ordered fashion as a consequence of the orienting effect of the interfacial reaction technique by which the original thin film is formed, so that the progressive disruption effect is not localized. It will also be understood that in other systems, with polymers that do not offer the diverse linkages, the technique will be effective as well, since in most cases the control of concentration, time, temperature, and uniform distribution of the reactant will achieve the same end.

Interestingly, the disruption of the cross links tends to improve the physical properties of such thin film rather generally. The toughness and resiliency of the films is ordinarily enhanced by the low cross link density. In addition, the reaction of the most reactive sites in the film tends to make the resulting ultraporous thin film more vulnerable sites are no longer present. The reactive sites which remain are sufficiently resistant to attack in many environments of use to have greater useful lives, although in demanding circumstances it may be desirable to block these sites when possible by reaction with an appropriate blocking agent, or the like.

Directly comparable results can be attained with other polymers in thin film form by other analogous reactions. For example, polyesters and polyamides are subject to acid hydrolysis with dilute strong acids, with results which are directly analogous to those of the PEI/IPC system. Those of ordinary skill in the art will be able to adapt the procedure to a wide diversity of polymer thin films with the guidance afforded herein.

The ultraporous thin film membranes of the present invention and the composites including such ultraporous thin film membranes are particularly suited to dialysis applications, where the operations are diffusion based and dependent on concentration gradients rather than pressure differentials for their driving mechanism. As those of ordinary skill will readily recognize, thin films are not as strong as thick films, and are more susceptible to damage from physical forces.

Nonetheless, the ultrafiltration thin film membranes of the present invention are substantially more durable in use in pressure driven systems and will find a real and substantial utility in ultrafiltration applications. While care must be taken to avoid exceeding the physical capabilities of the membrane, that is a requirement of all membrane filtration operations, and there are few ultrafiltration operations which cannot be performed with the ultrafiltration thin film membranes of the present invention. It will ordinarily be useful to do so, since the flow rates for a given pore size and molecular weight cutoff and operating pressure are materially increased with no reduction in filtration effectiveness, and in many cases with increased filtration effectiveness at the appropriate pressure differentials and flow rates.

With the selection of appropriate materials and pore sizes, the ultrafiltration thin film membranes of the present invention are particularly desirable for use for molecular separations in dialysis and ultrafiltration applications in biological systems, including for example, for hemodialysis, for the recovery and purification of biological materials from natural sources and from culture media, and the like, including for example the recovery and purification of monoclonal antibodies from cell cultures, and other related uses, where particular advantage can be taken of the low flow resistance as well as the relative freedom from plugging and fouling and the low degree of incidence of dynamic membrane formation of the ultrafiltration thin film membranes of the present invention.

In all contexts the provision of ultrafiltration thin film membranes to the art is a direct benefit by virtue of the increase in permeability achieved as a consequence of the present invention.

EXAMPLES:

The following examples serve to illustrate the present invention.

EXAMPLES I TO VI

A series of ultrafiltration thin film membranes were formed on a microporous support by the following procedure The support employed is an integral skinned highly asymmetric polysulfone microporous membrane, commercially available from Brunswick Technetics under the trademark designation "BTSS1," having a pore size of 0.2 microns, and a thickness of about 100 microns.

Except as noted, the support membrane was soaked for twelve hours in a 1.00 weight percent aqueous solution of polyethylene imine (Aldrich), having a molecular weight of 12,000.

The wetted membrane was removed from the PEI solution, and drained vertically for 60 seconds, and was then contacted with a solution of toluene diisocyanate in hexane, of varying concentrations, for a contact time of 15 seconds The composite was rinsed to remove excess reactants, and oven dried for five minutes at 120 degrees centigrade.

The resulting composite was then evaluated to ascertain permeability for water, Q, measured in cm/min at 100 psi, and molecular weight cutoff These values are reported, with TDI concentrations, in TABLE I:

TABLE I

| Example | % TDI | Q | MWCO |
|---|---|---|---|
| 1* | 0.250 | 0.030 | 100 |
| 2 | 0.250 | 0.200 | 1,000 |
| 3 | 0.125 | 0.300 | 10,000 |
| 4 | 0.075 | 1.3 | 80,000 |
| 5** | 0.075 | 10 | 100,000 |
| 6*** | 0.075 | 40 | 1,000,000 |

*Based on a 2.50% solution of PEI rather than 1.00%
**Based on a drainage time of 120 seconds rather than the 60 seconds standard.
***Based on Epiamine rather than PEI.

As the data of Table I shows, the characteristics of ultrafiltration thin film membranes in the present invention can be made with pore sizes controllably formed throughout the range of ultraporous dimensions.

It is also apparent that the characteristics are dependent on the concentration of cross linking agent, the relative proportions of polymer and crosslinking agent, and the nature of the specific polymer system employed.

EXAMPLES VII TO XII

Following the procedure of Examples I to VI, additional ultrafiltration thin film membranes were formed, to expand upon the effect of the concentration of TDI in the cross linking phase. The concentration of the PEI solution was, in these examples, 0.25 weight percent. The drainage time was 90 seconds, the reaction time 15 seconds, and the heat treatment was 5 minutes at 120 degrees. The variables and measurements are shown in TABLE II, below.

TABLE II

| Example | % TDI | Q | MWCO |
|---|---|---|---|
| 7* | 0.0 | 18.4 | 1,000,000+ |
| 8 | 0.005 | 10.2 | 100,000 |
| 9 | 0.01 | 8.0 | 80,000 |
| 10 | 0.05 | 2.50 | 50,000 |
| 11 | 0.10 | 0.25 | 10,000 |
| 12 | 0.15 | 0.02 | 1,000 |

*Control.

These data show in a still more emphatic way the control of pore size to achieve molecular weight cutoff values of from about 500 to about 1,000,000 by the concentration of the cross linking agent.

Examples XIII to XVIII

Once again following the procedure of Examples I to VI, additional ultrafiltration thin film membranes were formed, to expand upon the effect of the concentration of TDI in the cross linking phase, but at different drainage times The concentration of the PEI solution was, in these examples, 0.50 weight percent. The drainage time was 120 seconds, the reaction time 15 seconds, and the heat treatment was 5 minutes at 120 degrees. The variables and measurements are shown in TABLE III, below.

TABLE III

| Example | % TDI | Q | MWCO |
|---|---|---|---|
| 13 | 0.125 | 6.9 | 80,000+ |
| 14 | 0.150 | 8.0 | 80,000 |
| 15 | 0.200 | 5.1 | 50,000 |
| 16 | 0.250 | 0.22 | 1,000 |
| 17 | 0.50 | 0.03 | 100 |
| 18 | 1.0 | 0.03 | 100 |

These data show the control of pore size by the concentration of the cross linking agent. It is apparent from a comparison of these data with Table II that drainage time is also a control parameter of import.

EXAMPLES IXX TO XXVIII

Once again following the procedure of Examples I to VI, additional ultrafiltration thin film membranes were formed, to expand upon the effect of the concentration of TDI in the cross linking phase, but again at still different drainage times. The concentration of the PEI solution was, in these examples, 0.50 weight percent. The drainage time was 60 seconds, the reaction time 15 seconds, and the heat treatment was 5 minutes at 120 degrees. The variables and measurements are shown in TABLE IV, below.

TABLE IV

| Example | % TDI | Q | MWCO |
|---|---|---|---|
| 19 | 0. | 18.4 | 1,000,000+ |
| 20 | 0.005 | 10.2 | 100,000 |
| 21 | 0.01 | 8.0 | 100,000 |
| 22 | 0.025 | 6.0 | 80,000 |
| 23 | 0.05 | 2.5 | 50,000 |
| 24 | 0.10 | 0.25 | 1,000 |
| 25 | 0.15 | 0.02 | 100 |
| 26 | 0.20 | 0.02 | 100 |
| 27 | 0.25 | 0.08 | 100 |
| 28 | 0.30 | 0.05 | 100 |

These data show the control of pore size by the concentration of the cross linking agent. These data, in comparison with Table II and III confirm that drainage time is also a control parameter of import.

EXAMPLES XXIX TO XXXIII

Once again following the procedure of Examples I to VI, additional ultrafiltration thin film membranes were formed, in this series to illustrate the effect of molecular weight of the PEI polymer. The concentration of the PEI solution was, in these examples, 2.50 weight percent; the concentration of the TDI was 0.250 weight percent. The drainage time was 60 seconds, the reaction time 15 seconds, and the heat treatment was 5 minutes at 120 degrees. The variables and measurements are shown in TABLE V, below.

TABLE V

| Example | M.W. of PEI | Q, cm/min |
|---|---|---|
| 29 | 10,000 | 0.8 |
| 30 | 30,000 | 0.2 |
| 31 | 60,000 | 0.05 |
| 32 | 80,000 | 0.025 |
| 33 | 100,000 | 0.011 |

These data show a clear effect of molecular weight of the PEI on the porosity of the resulting ultrafiltration thin film membranes.

EXAMPLES XXXIV TO XXXVI

Once again following the procedure of Examples I to VI, additional ultrafiltration thin film membranes were formed, in this series to illustrate the development of an optimum of permeability over time, and the subsequent decline, in this series of examples using a PEI having a molecular weight of 60,000. The concentration of the PEI solution was, in these examples, 0.7 weight percent; the concentration of the TDI was 0.1 weight percent. The drainage time was varied, the reaction time 15 seconds, and the heat treatment was 5 minutes at 120 degrees. The variables and measurements are shown in TABLE VI, below.

TABLE VI

| Example | Drain Time, sec. | Q, cm/min |
|---|---|---|
| 34 | 15 | 0.4 |
| 35 | 80 | 5.1 |
| 36 | 120 | 2.2 |

EXAMPLES XXXVII TO XLIII

Once again following the procedure of Examples I to VI, additional ultrafiltration thin film membranes were formed, in this series to illustrate the development of an optimum of permeability over time, and the subsequent decline, again using a PEI having a molecular weight of 60,000. The concentration of the PEI solution was, in these examples, 0.7 weight percent; the concentration of the TDI was 0.1 weight percent. The drainage time was varied, the reaction time 15 seconds, and the heat treatment was 5 minutes at 120 degrees. The variables and measurements are shown in TABLE VII, below.

TABLE VII

| Example | Drain Time, sec. | Q, cm/min |
|---|---|---|
| 37 | 15 | 0.4 |
| 38 | 30 | 1.8 |
| 39 | 45 | 8.6 |
| 40 | 60 | 5.2 |
| 41 | 90 | 7.0 |
| 42 | 120 | 1.3 |
| 43 | 180 | 2.2 |

EXAMPLES XLIV TO LIII

In the present series of examples, the criticality of a minimum degree of cross linking is shown, again using the same procedure described above for Examples I to VI. In these examples, the PEI film was drained until the golden color of the optical interference pattern was obtained, generally on the order of 180 to 240 seconds. The color is indicative of a liquid film thickness of about 100 nanometers. The uncoated support was included as a control, along with a second control of the substrate coated with the PEI film, but not cross linked. These data are shown in Table VIII.

TABLE VIII

| Example | % TDI | Q, cm/min |
|---|---|---|
| *44 | 0 | 85 |
| **45 | 0 | 40 |
| 46 | 0.05 | 40 |
| 47 | 0.06 | 40 |
| 48 | 0.07 | 36 |
| 49 | 0.10 | 38 |
| 50 | 0.12 | 36 |
| 51 | 0.14 | 4.1 |
| 52 | 0.16 | 0.5 |
| 53 | 0.18 | 0.05 |

*Control, No PEI Coating (porous support only)
**Control, PEI Coated, no cross linking These data show in part that when the level of the cross linking agent is too low, the thin film may be discontinuous and ineffective as an ultrafiltration thin film membrane.

EXAMPLES LIV TO LX

In the present series of examples, the modification of the partition coefficient of the interfacial phase boundary is shown, again using the same procedure described above for Examples I to VI. In these examples, the PEI film was drained until the golden color of the optical interference pattern was obtained, generally on the order of 180 to 240 seconds. The color is indicative of a liquid film thickness of about 100 nanometers. The PEI solutions, with a concentration of 2.0 weight percent PEI, were formed in a variety of solutions using as solvents water and a variety of ethanol-water mixtures. The crosslinking agent was 0.1 weight percent TDI in hexane. The reaction time was 30 seconds, and the composite was rinsed in pure hexane, and then heated for 5 minutes at 120 degrees Centigrade. These data are shown in Table IX.

TABLE IX

| Example | % HOH | % EtOH | Q, cm/min |
|---|---|---|---|
| 54 | 100 | 0 | 20 |
| 55 | 90 | 10 | 16 |
| 56 | 70 | 30 | 17 |
| 57 | 60 | 40 | 20 |
| 58 | 50 | 50 | 4.5 |
| 59 | 40 | 60 | 2.5 |
| 60 | 20 | 80 | 0.002 |

EXAMPLES LXI TO LXIX

In the present series of examples, the polymer system was based on the reaction of epiamine (EA) with IPC to form the polyamide, again using the same procedure described above for Examples I to VI. In these examples, the aqueous EA film was drained until the golden color of the optical interference pattern was obtained, generally on the order of 240 seconds. The color is indicative of a liquid film thickness of about 100 nanometers. The co-monomer in the organic phase was isophthaloyl dichloride, at a concentration of 0.5 weight percent in hexane. With the exception of Examples 62 and 69, the support employed had a molecular weight cutoff of 10,000. These data are shown in Table X.

TABLE X

| Example | % EA | Water Flow Observation |
|---|---|---|
| *61 | 1.0 | 0.1 ml/min. |
| **62 | 1.0 | fast |
| 63 | 1.0 | fast |
| 64 | 2.5 | fast |
| 65 | 3.8 | moderate |
| 66 | 4.5 | 0.31 ml/min. |
| 67 | 5.0 | slow |
| 68 | 10.0 | very slow |
| **69 | 10.0 | slow |

*Support membrane molecular weight cutoff 10,000
**Support membrane molecular weight cutoff 100,000

EXAMPLES LXX TO LXXXII

The procedure of Examples 1 to 6 was employed substituting isophthaloyl dichloride, in varying proportions in hexane as the cross linking agent. These membranes are shown in Table XI.

TABLE XI

| Example | % PEI | % IPC | Water Flow |
|---|---|---|---|
| 70 | 4.2 | 0.5 | 0.29 ml/min. |
| 71 | 2.5 | 0.5 | slow |
| 72 | 1.25 | 0.5 | slow |
| 73 | 0.75 | 0.5 | 0.1 ml/min. |
| 74 | 0.75 | 0.25 | 0.1 ml/min. |
| 75 | 0.40 | 0.25 | 0.5 ml/min. |
| 76 | 0.20 | 0.50 | 1.1 ml/min. |
| 77 | 0.20 | 0.25 | 3.2 ml/min. |
| 78 | 0.50 | 0.50 | <0.001* |
| 79 | 0.50 | 0.25 | <0.001* |
| 80 | 1.0 | 0.75 | <0.001* |
| 81 | 0.80 | 0.75 | <0.001* |
| 82 | 0.75 | 0.75 | <0.001* |

*Q values for these membranes was too low to quantify by the techniques employed; there was no measurable flow at 100 psi, and these examples are believed to be in the reverse osmosis range of permeability.

EXAMPLES LXXXIII TO LXXXIX

A series of highly crosslinked polyethyleneimine-toluene iisocyanate thin films, having an $H_2O$ permeability of 0.033 cm/min were treated with varying concentrations of hypochlorous acid by contacting the surface of the film for specified times. The results are shown in Table XII.

TABLE XII

| Example | % OXYCHLORIDE | Time sec. | Q, CM/MIN |
|---------|---------------|-----------|-----------|
| 83 | 0 | 0 | 0.033 |
| 84 | 0.5 | 320 | 0.29 |
| 85 | 1.0 | 280 | 0.54 |
| 86 | 1.5 | 240 | 0.57 |
| 87 | 2.0 | 228 | 0.71 |
| 88 | 2.5 | 229 | 1.04 |
| 89 | 3.5 | 180 | 1.15 |

EXAMPLES XC TO XCV

The selective disruption of cross links to control pore size and permeability properties of thin film membranes is further demonstrated by the present Examples, all using the membrane of Example 82, supra. A diverse variety of agents was employed, in appropriate concentrations for each. In each case, a specimen of the reverse osmosis membrane was contacted, on the thin film surface, with the agent for the time specified, and then rinsed in water for thirty seconds before the Q values were determined. The results are shown in Table XIII.

TABLE XIII

| Example | Agent | Conc. | Vol. | Time | Q, cm/min |
|---------|-------|-------|------|------|-----------|
| 90 | HCl | 10% | 10 | 42.0 m. | 0.166 |
| 91 | $H_2O_2$ | 30% | 10 | 12.0 m. | 0.277 |
| 92 | NaOH | 1 N. | 8 | 8.0 m. | 0.533 |
| 93 | $H_2SO_4$ | 50% | 1.5 | 12.0 m. | 0.160 |
| 94 | NaOCl | 1% | 10 | 150 s. | 3.58 |
| 95 | NaOCl | 5% | 10 | 57 s. | 4.44 |

EXAMPLES XCVI TO CI

A single highly cross linked polyethyleneimine-toluene diisocyanate thin film was formed on a BTS-55 support The thin film membrane was formed by reaction of 1.0 percent aqueous PEI with 0 5 percent solution of TDI in hexane. The resulting fully cross linked thin film exhibited a flux (Q, cm/min) of 0.1, and rejected more than 99 percent NaCl. The membrane was then sequentially treated with NaOCl solutions in water in progressively increasing concentration. Each treatment was continued to steady state conditions. The membrane was then washed with water and the flux and molecular weight cutoff values were determined. After each determination, the membrane was rinsed and back washed with water before the next cross link disruption treatment. The results are shown in TABLE XIV.

TABLE XIV

| Example | % NaOCl | Q, cm/min | Compound | % Rejection |
|---------|---------|-----------|----------|-------------|
| *96 | 0 | 0.1 | NaCl | >99 |
| 97 | 0.6 | 2 | NaCl | 75 |
| 98 | 1.0 | 6 | Vitamin B-12 | 89 |
| 99 | 2.5 | 20 | NaCl | 9 |
|  |  |  | Cytochrome-C | 86 |
|  |  |  | Vitamin B-12 | 0 |
| 100 | 4.0 | 38 | IgG | 94 |
|  |  |  | Cytochrome-C | 0 |
| 101 | 5.0 | 50 | Dextran Blue | 90 |
|  |  |  | IgG | 11 |

*Unmodified membrane before treatment.

The data of TABLE XIV are a clear presentation of the dependence of the disruption of the cross links of the membrane and of the increasing pore size, as indicated by the molecular weight cutoff data, of the concentration of the reagent solution and of the achievement of a stable equilibrium pore size as a function of that concentration.

All the foregoing examples should be considered as informative, and not as limiting on the scope of the present invention. The particular definitive aspects of the present invention are set forth in the claims as appended hereto.

What is claimed is:

1. An ultraporous membrane consisting essentially of a cross linked polymeric thin film membrane having a thickness of from about 1.2 to 150 nanometers and a cross link density sufficient to provide a limiting pore size corresponding to molecular weight cutoff values of from about 500 to about 1,000,000.

2. The ultraporous membrane of claim 1 wherein said thin film has a thickness of from about 1.2 nanometers to about 20 nanometers.

3. The ultraporous membrane of claim 1 wherein said thin film is a cross linked polymer selected from the group consisting of polysaccharides, polysilicones, polyamides, polyacrylics, and polyimines.

4. The ultraporous membrane of claim 1 wherein said cross-linked polymer is a multifunctional isocyanate cross linked polyimine.

5. The ultraporous membrane of claim 4 wherein said polyimine is polyethyleneimine.

6. The ultraporous membrane of claim 5 wherein said diisocyanate is toluene diisocyanate.

7. The ultraporous membrane of claim 4 wherein said multifunctional isocyanate is a diisocyante.

8. The ultraporous membrane of claim 4 wherein said cross linked polymer is a polyamide.

9. The ultraporous membrane of claim 8 wherein said polyamide is a multifunctional acyl compound cross linked polyimine.

10. The ultraporous membrane of claim 9 wherein said polyimine is polyethylene imine.

11. The ultraporous membrane of claim 9 wherein said multifunctional acyl compound is an aromatic diacyl or triacyl halide.

12. The ultraporous membrane of claim 11 wherein said aromatic acyl halide is a phthaloyl dichloride.

13. The ultraporous membrane of claim 12 wherein said phthaloyl is isophthaloyl dichloride.

* * * * *